United States Patent [19]

Ye et al.

[11] Patent Number: 5,045,759
[45] Date of Patent: Sep. 3, 1991

[54] POWER SUPPLY FOR LASER FLASHLAMP

[76] Inventors: Biqing Ye, University of Florida, College of Medicine, P.O. Box J-277 JHMHC, Gainesville, Fla. 32610; Zhonglin Ma, Apt. 403, Building 4, Lane 55, Wensu Road, Jading, Shanghai, Switzerland, 200433

[21] Appl. No.: 484,427
[22] Filed: Feb. 26, 1990
[51] Int. Cl.$^5$ ............................................. H01S 3/00
[52] U.S. Cl. .................................. 315/171; 315/176; 315/205; 315/362
[58] Field of Search ............... 315/171, 175, 176, 205, 315/208, 291, 294, 362

[56] References Cited

U.S. PATENT DOCUMENTS 3,551,738 12/1970 Young ................................ 315/171

Primary Examiner—Robert J. Pascal
Attorney, Agent, or Firm—Polster, Polster and Lucchesi

[57] ABSTRACT

An N-phase power supply (1) for operation of a laser flashlamp (F). A first electrical circuit (3) is connected between an N-phase source of electrical energy and the flashlamp for continuously supplying electrical current thereto. A second electrical circuit (13) is also interconnected between the source of electrical energy and the flashlamp. This second circuit is for supplying current pulses to the flashlamp. The second circuit includes an N-phase bridge (15) having an electronic switch (17A, 17B, 17C) in each branch (19A, 19B, 19C) of the bridge. An electronic controller (25) controls operation of each switch to produce the current pulses supplied to the flashlamp.

19 Claims, 2 Drawing Sheets

POWER SUPPLY FOR LASER FLASHLAMP

BACKGROUND OF THE INVENTION

This invention relates to long-pulsewidth lasers and more particularly, to a power supply for a long-pulsewidth laser flashlamp.

Since the invention of the laser, short-pulsewidth solid-state lasers have been developing rapidly. With the development of the high power continuous wave (CW) Nd: YAG laser, the output power of the laser went from several watts, in a single-rod operation, to 1,000 watts in a multiple-rod operation. This type of CW laser has broad applications in material cutting, drilling, annealing, and heat treatment of metals.

Because of various short comings with short-pulse lasers and CW lasers, a long-pulsewidth pulsed Nd: YAG laser with high average power has been in development in recent years. This laser has an average output power of several hundred watts. With recent developments, this type laser now has an average output power of 400 watts and a peak output power of 10,000 watts.

There are two types of power supplies for driving laser flashlamps. One is a conventional charger and inductor-capacitor forming network; while the other utilizes a rectified current source, a high-frequency switch, and an inductor-capacitor filter. With the former type of power supply, one problem encountered is in driving a laser flashlamp with pulses in excess of approximately 2 milliseconds (2 ms). To overcome this problem, multiple capacitor-inductor networks, connected in series, are used. Such systems tend to be inflexible, heavy, and expensive. Compared with this former type system, the latter is compact and has a high degree of flexibility. Therefore it is applied to industrial laser applications as a pumping power supply. However, this latter type power supply is quite expensive and technically complex.

SUMMARY OF THE INVENTION

Among the several objects of the present invention may be noted the provision of an N-phase power supply for a laser flashlamp; the provision of such power supply which is designed for use with a long-pulsewidth pulsed laser such as a Nd: YAG laser; the provision of such a power supply for supplying both a continuous current and pulsed current to the laser flashlamp; the provision of such a power supply to provide current pulses to the laser flashlamp in one of a number of predetermined sequences; the provision of such power supply to have an adjustable pulsewidth and repetition rate of the pulse output; and, the provision of such power supply which is simple in design, flexible in use, reliable, and low in cost.

Briefly, an N-phase power supply is for operating a laser flashlamp. A first electrical circuit is interconnected between an N-phase source of electrical energy and the flashlamp. This first electrical circuit continuously supplies electrical current to the flashlamp. A second electrical circuit is also interconnected between the source of electrical energy and the flashlamp. This second electrical circuit is for supplying electrical current pulses to the flashlamp and includes an N-phase bridge having an electronic switch in each branch of the bridge. A controller controls operation of each switch to produce the current pulses supplied to the flashlamp.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENT

Figure 1:
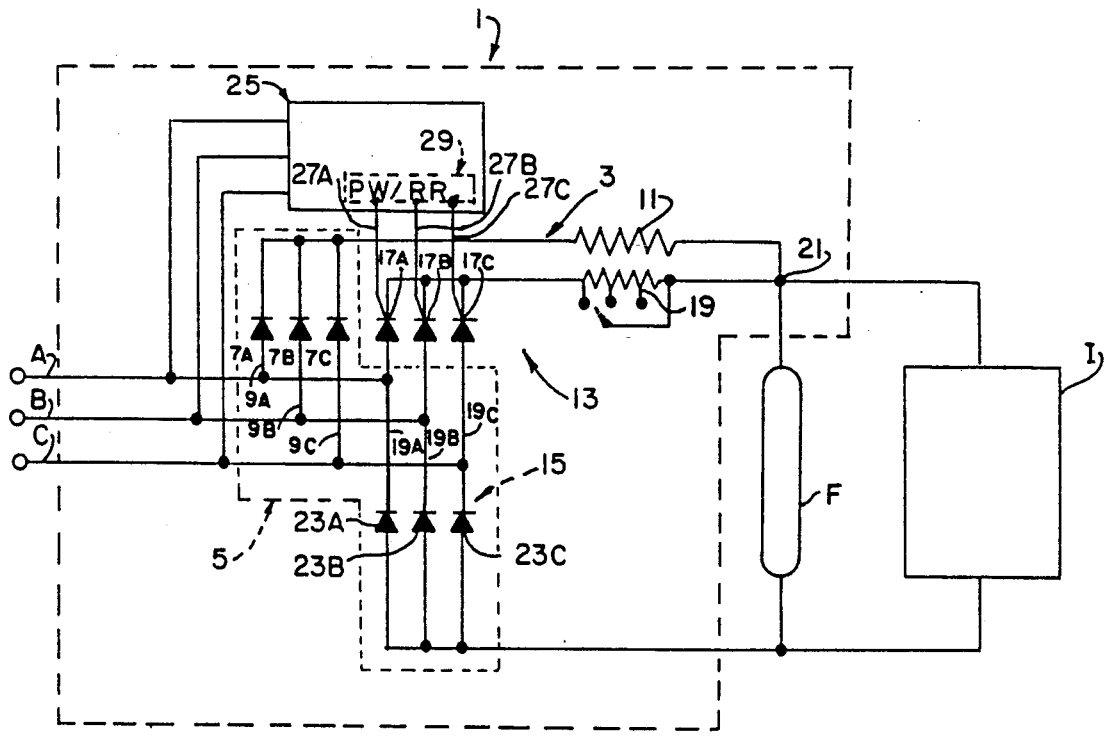
FIG. 1 is a schematic of a first embodiment of a power supply of the present invention.

Referring to FIG. 1, a power supply of the present invention is indicated generally 1. The power supply is an N-phase power supply for operation of a laser flashlamp F. As shown in FIG. 1, power supply 1 is for use with a three-phase source of electrical energy, the various phases being indicated A, B, and C respectively. It will be understood that the power supply can be used with a single-phase source of electrical energy as well. Also, in addition to supplying power to flashlamp F the power supply can also supply power to an ignition and starting circuit I of the laser.

Figure 2A:
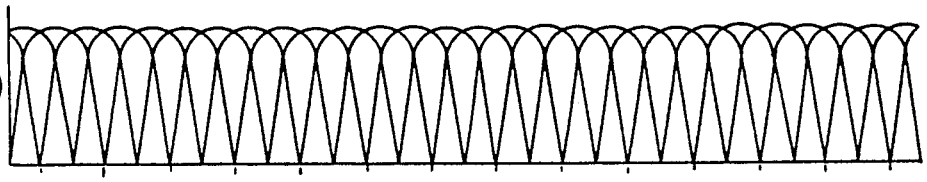
FIGS. 2(a)–(l) are representations of various wave forms taken at different points throughout the power supply and for different operating conditions of the power supply; and, FIG. 3 is an electrical schematic of a second embodiment of the power supply of the present invention.
Figure 2B:
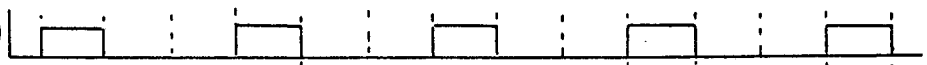
Figure 2C:
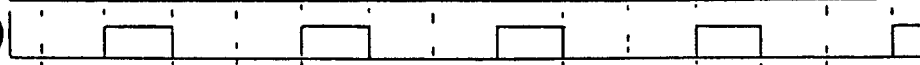
Figure 2D:
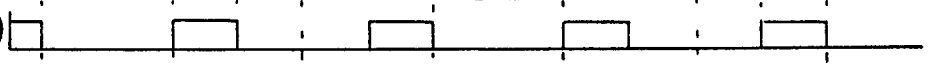
Figure 2E:
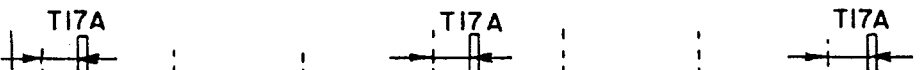
Figure 2F:
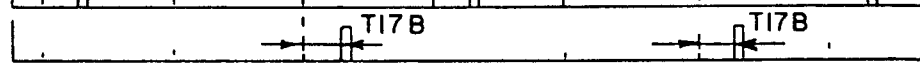
Figure 2G:
Figure 2H:
Figure 2I:
Figure 2J:
Figure 2K:
Figure 2L:
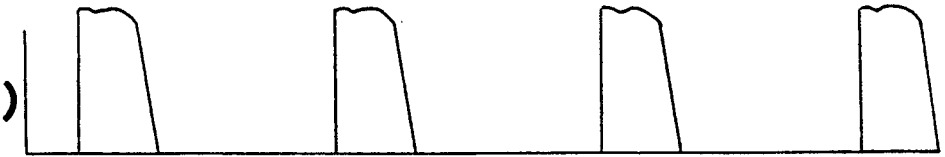

Power supply 1 includes a first electrical circuit 3 which is interconnected between the three phase source of electrical energy and the flashlamp. Circuit 3 is used to continuously supply a low-level, simmer electrical current to the flashlamp. The circuit includes a three-phase bridge 5 for rectifying the respective phase components of the electrical energy supplied from the power source. The rectification is accomplished by diodes 7A, 7B, 7C and 23A, 23B, 23c. Diodes 7A, 7B and 7C are connected in respective branches 9A, 9B, and 9C of the bridge. The cathodes of these diodes (7A, 7B and 7C) are commonly connected to one side of flashlamp F. A resistor 11 is connected between the commonly connected cathodes of these diodes and the flashlamp. The current waveform of the three-phase, rectified current continuously supplied to the flashlamp by circuit 3 is shown in FIG. 2(a). The current wave form has a ripple, and the frequency of the this ripple is equal to 2M.

Power supply 1 has a second electrical circuit 13 interconnected between the electrical energy source and flashlamp F. Circuit 13 is for supplying electrical current pulses to the flashlamp. The circuit includes a three-phase bridge 15. An electronic switch or silicon controlled rectifier (SCR) 17A, 17B, and 17C are in respective branches 19A, 19B and 19C of the bridge. The cathodes of the respective SCRs are commonly connected to the same side of flashlamp F as the commonly connected cathodes of diodes 7A, 7B and 7C. A variable resistance 19 is interposed between the common connection of the SCRs and flashlamp F. Circuits 3 and 13 have a common junction point 21 between their respective resistances 11 and 19, and the flashlamp. In addition to the SCRs, a rectifier diode 23A, 23B and 23C, are respectively included in legs 19A, 19B, and 19C of bridge 15. The anodes of diodes 23A, 23B and 23C are commonly connected to the other side of flashlamp F from the side to which the commonly connected cathodes of SCRs are connected.

Next, the power supply includes a controller 25 for controlling operation of the SCRs to produce the current pulses supplied to the flashlamp. Controller 25 is supplied power from each input phase of electrical energy. The controller further has three outputs, each respective output being connected to a gate input of a respective SCR. An output line 27A connects to the gate input of SCR 17A; while respective output lines 27B and 27C are connected to the gate inputs of SCRs 17B and 17C. The gate signals provided to the respective SCRs trigger the SCRs into conduction. Further, these gate signals are supplied to the SCRs in a predetermined sequence. A circuit 29 within controller 25 is used to determine these sequences, as well as the repetition rate (RR) and pulsewidth (PW) of the pulses supplied to flashlamp F. Circuit 29 controls the gate input signals supplied to the SCRs.

Referring to FIG. 2, FIGS. 2(b), 2(c), and 2(d), represent the allowable interval for triggering the respective SCRs 17A, 17B, and 17C. In order to balance the current pulses in each branch of the bridge, the repetition rate (RR) of the pulse output to flashlamp F must be equal to $M/(3n+1)$ or $M/(3n+2)$, where M is equal to one-half the frequency of the ripple in the current continuously supplied to the flashlamp; and where n is either zero or a positive integer (i.e., n equals 0, 1, 2, 3, etc.). For example, the repetition rate equals M/2 when $M/(3n+2)$ and $n=0$. Similarly, the repetition rate equals M/4 when $M/(3n+1)$ and $n=1$. As noted, circuit 29 can also be used to adjust the pulsewidth of each pulse output from circuit 13. This is done by changing the respective delay time T17A, T17B, and T17C for each respective SCR triggering pulse. As shown in FIGS. 2(e), 2(f) and 2(g) the delay time interval for triggering each respective SCR is determined with respect to the initial moment within the allowable triggering interval for the SCR. Referring to FIGS. 2(e)-2(h), a first example of a time delay is shown. This example is for the situation where the repetition rate is M/2. As shown, the circular triggering process of the various SCRs is such that SCR 17A is triggered first, then SCR 17C and then SCR 17B. FIG. 2(h) represents the output pulse train provided by circuit 13 to the flashlamp. Referring to FIGS. 2(i)-2(l), the situation where the pulse repetition rate is M/4 is shown. Here, the circular triggering process is SCR 17A, then SCR 17B, and then SCR 17C. FIG. 2(l) represents the pulse train output provided by circuit 13 to the flashlamp for this triggering sequence.

Figure 3:
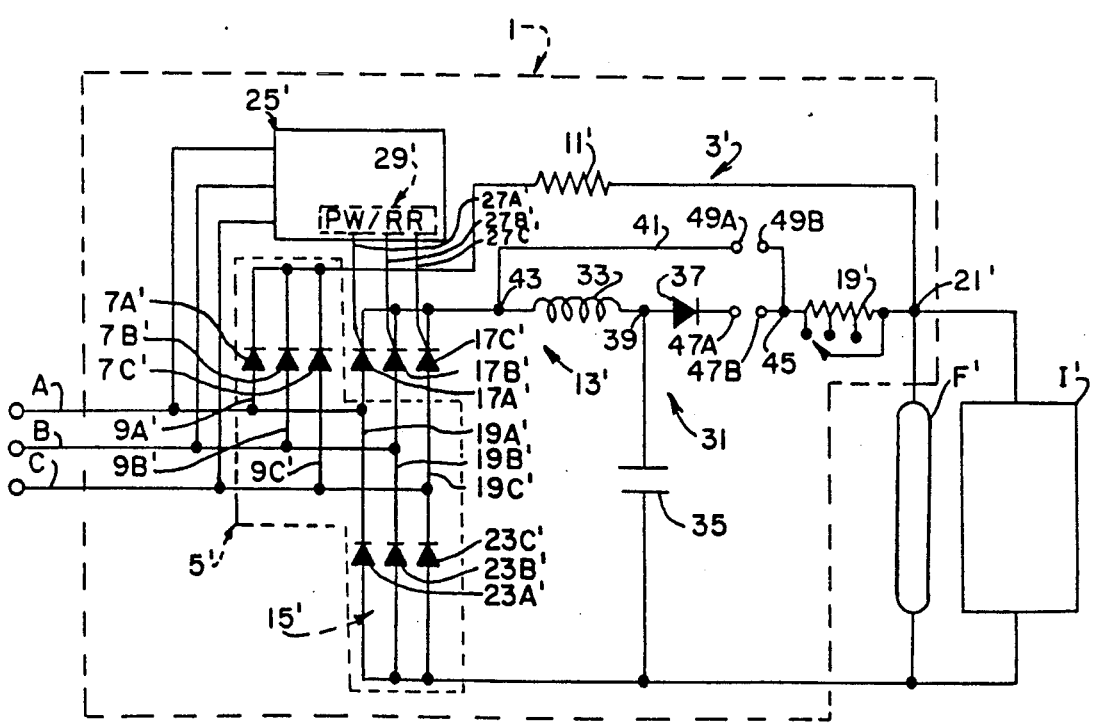

While power supply 1, as described, is useful with long-pulsewidth pulsed lasers such as Nd:YAG, Nd:YAP, or Nd:glass laser applications, a variant of the power supply can also be used with continuous wave (cw) lasers (see FIG. 3). Now, lamp F' may be a krypton arc lamp for a cw laser. A filter 31 is now connected between the commonly connected cathodes of the SCRs and a variable resistance 19'. An inductor 33 is connected in series with the commonly connected outputs of the SCR's and the variable resistance. A capacitor 35 is connected in parallel with the variable resistance and the arc lamp. In addition, a diode 37 is connected between a junction 39 of the inductor and capacitor and the variable resistance. Further, a jumper 41 is connected between the cathodes of the SCRs and the variable resistance. The jumper extends from a junction 43 between the SCRs and the inductor, and a junction 45 between the diode and variable resistance. Circuit 13' and jumper 41 each have a pair of terminals; 47A, 47B in circuit 13' and 49A, 49A in jumper 41. In operation, if power supply 1' is being used with a pulsed laser, a connection is made between terminals 49A, 49B so circuit 13' bypasses filter 31. If, however, the power supply is used with a cw laser, terminals 47A and 47B are connected and the output pulses provided by circuit 13' are provided to the laser arc lamp through the filter and variable resistance.

In view of the above, it will be seen that the various objects and features of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed:

1. An N-phase power supply for operation of a laser flashlamp comprising:
   first electrical circuit means interconnected between an N-phase source of electrical energy and the flashlamp for continuously supplying electrical current thereto; and,
   second electrical circuit means interconnected between the source of electrical energy and the flashlamp for supplying pulses of electrical current to the flashlamp, the second electrical circuit means including an N-phase bridge having electronic switch means in each branch thereof, and control means for controlling operation of each switch means to produce the current pulses supplied to the flashlamp, and wherein $N>1$.

2. An N-phase power supply for operation of a laser flashlamp comprising:
   first electrical circuit means interconnected between an N-phase source of electrical energy and the flashlamp for continuously supplying electrical current thereto, the first circuit means including an N-phase bridge including rectifier means in each branch of the bridge; and,
   second electrical circuit means interconnected between the source of electrical energy and the flashlamp for supplying electrical current pulses thereto, said second circuit means including an N-phase bridge having an electronic switch means in each branch thereof, and control means for controlling operation of each switch means to produce current pulses supplied to the flashlamp.

3. The power supply of claim 1 wherein the rectifies means comprises 2N diodes, the cathodes of N diodes being commonly connected to one side of the flashlamp, and the anodes of the other N diodes being commonly connected to the other side of the flashlamp.

4. The power supply of claim 3 wherein the first circuit means further includes resistance means connected between the commonly connected cathodes and the flashlamp.

5. The power supply of claim 1 wherein the switch means comprises a silicon controlled rectifier (SCR) in each branch of the bridge, the cathodes of the SCR's being commonly connected to one side of the flashlamp.

6. The power supply of claim 5 wherein the control means includes a controller having N outputs, each respective output being connected to the gate input of a respective SCR.

7. The power supply of claim 6 wherein the controller includes means for providing gate signals to the SCR's to trigger them into conduction, the gate signals being supplied in predetermined sequence.

8. The power supply of claim 7 wherein the power supply is a 3-phase power supply and the signal providing means supplies gate signals to the SCR's at a repetition rate determined by the formula, repetition rate=M/(3n+1) where M is equal to one-half the ripple frequency of the continuously supplied current and n is zero or a positive integer.

9. The power supply of claim 7 wherein the power supply is a 3-phase power supply and the signal providing means supplies gate signals to the SCR's at a repetition rate determined by the formula, repetition rate=M/(3n+2) where M is equal to one-half the ripple frequency of the continuously supplied current and n is zero or a positive integer.

10. The power supply of claim 8 wherein the three phases are a, b, and c respectively and the predetermined sequence in which gate signals are supplied is a, b, c, a, b, c, etc.

11. The power supply of claim 9 wherein the three phases are designated a, b, and c respectively and the predetermined sequence in which gate signals are supplied is a, c, b, a, c, b, etc.

12. The power supply of claim 6 further including resistance means interconnected between the commonly connected cathodes of the SCR's and the flashlamp.

13. The power supply of claim 12 wherein the resistance means comprises a variable resistance.

14. The power supply of claim 12 wherein the flashlamp comprises a continuous wave (cw) arc lamp and the power supply further includes filter means interconnected between the commonly connected cathodes of the SCR's and the resistance means.

15. The power supply of claim 14 wherein the filter means further includes an inductor series connected with the resistance means and the arc lamp and a capacitor connected in parallel therewith.

16. The power supply of claim 15 further including a diode interconnected between the inductor and the resistance means.

17. The power supply of claim 16 further including jumper means connected between the commonly connected cathodes of the SCR's and the resistance means, said jumper means being connected in parallel with the inductor and the diode.

18. The power supply of claim 5 further including rectifier means in each branch of the bridge.

19. The power supply of claim 18 wherein the rectifier means comprises N diodes and N SCR's, the anodes of the N diodes being commonly connected to the other side of the flashlamp from the side to which the commonly connected cathodes of the SCR's are connected.

* * * * *

UNITED STATES PATENT AND TRADEMARK OFFICE
CERTIFICATE OF CORRECTION

PATENT NO.  : 5,045,759
DATED       : September 3, 1991
INVENTOR(S) : Biqing Ye, and Zhonglin Ma It is certified that error appears in the above—identified patent and that said Letters Patent is hereby corrected as shown below:

Title page, item [76], is "Shanghai, Switzerland, 200433" should be --Shanghai 200433, People's Republic of China--
Col. 4, line 2 is "if power supply 1' is being" should be --if power supply 1 is being--

Signed and Sealed this

Second Day of February, 1993

*Attest:*

STEPHEN G. KUNIN

*Attesting Officer*       Acting Commissioner of Patents and Trademarks